United States Patent
Beser

(10) Patent No.: US 7,899,929 B1
(45) Date of Patent: Mar. 1, 2011

(54) SYSTEMS AND METHODS TO PERFORM HYBRID SWITCHING AND ROUTING FUNCTIONS

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1456 days.

(21) Appl. No.: 10/856,852

(22) Filed: Jun. 1, 2004

Related U.S. Application Data

(60) Provisional application No. 60/475,901, filed on Jun. 5, 2003.

(51) Int. Cl.
*G06F 15/173* (2006.01)

(52) U.S. Cl. .................. 709/238; 709/245; 709/246; 370/235; 370/278; 370/401

(58) Field of Classification Search ......... 709/238–242, 709/250, 245–246; 370/235, 278, 355–356, 370/400–401
See application file for complete search history.

(56) References Cited

U.S. PATENT DOCUMENTS

| | | | | |
|---|---|---|---|---|
| 5,920,705 A | * | 7/1999 | Lyon et al. .................. | 709/238 |
| 6,049,834 A | * | 4/2000 | Khabardar et al. .......... | 709/242 |
| 6,104,727 A | * | 8/2000 | Moura et al. ................. | 370/235 |
| 6,801,528 B2 | * | 10/2004 | Nassar ....................... | 709/245 |
| 6,865,613 B1 | * | 3/2005 | Millet et al. ................. | 709/245 |
| 6,934,260 B1 | * | 8/2005 | Kanuri ....................... | 370/401 |
| 7,069,344 B2 | * | 6/2006 | Carolan et al. .............. | 709/250 |
| 7,088,727 B1 | * | 8/2006 | Short et al. .................. | 370/401 |
| 7,222,188 B1 | * | 5/2007 | Ames et al. ................. | 709/238 |
| 7,287,072 B1 | * | 10/2007 | Dispensa et al. ............ | 709/224 |
| 7,342,884 B2 | * | 3/2008 | Chen et al. .................. | 370/235 |
| 7,401,126 B2 | * | 7/2008 | Pekkala et al. .............. | 709/217 |
| 7,478,173 B1 | * | 1/2009 | Delco .......................... | 709/250 |
| 7,499,450 B2 | * | 3/2009 | Foglar et al. ................. | 370/401 |
| 2002/0178289 A1 | * | 11/2002 | Kurose ....................... | 709/245 |
| 2004/0093430 A1 | * | 5/2004 | Thomas ...................... | 709/245 |

* cited by examiner

*Primary Examiner*—Bharat N Barot
(74) *Attorney, Agent, or Firm*—Harrity & Harrity, LLP

(57) ABSTRACT

A system aggregates connections to multiple customer devices. The system receives data, performs switching functions on the data when the data is to be transmitted in a first direction, performs routing functions on the data when the data is to be transmitted in a second direction, and transmits the data in the first or second direction.

20 Claims, 11 Drawing Sheets

SYSTEMS AND METHODS TO PERFORM HYBRID SWITCHING AND ROUTING FUNCTIONS

RELATED APPLICATION

This application claims priority under 35 U.S.C. §119 based on U.S. Provisional Application No. 60/475,901, filed Jun. 5, 2003, the disclosure of which is incorporated herein by reference.

BACKGROUND OF THE INVENTION

1. Field of the Invention

The present invention relates generally to data processing and, more particularly, to systems and methods for aggregating large numbers of devices.

2. Description of Related Art

An issue that is beginning to arise in network environments involves the answer to the question of how to connect a large number of customer devices to a single point. The issue is particularly troublesome when the number of customer devices becomes quite large, such as tens of thousands or hundreds of thousands or more customer devices.

Some existing systems address this issue. FIG. 1 is a diagram of one existing system 100 for connecting a large number of customer devices. System 100 includes customer devices (CDs) 110-1 through 110-N (collectively referred to as customer devices 110) connected to device 120 via switch 130 and router 140. Customer devices 110 may include personal computers. Device 120 may include a personal computer or a network device, such as a router or switch. Switch 130 and router 140 may include conventional network devices.

When a customer device, such as customer device 110-1, sends a packet to device 120, customer device 110-1 may generate an Internet Protocol (IP) packet. FIG. 2 is a simplified diagram of an IP packet 200. IP packet 200 includes payload 210, source IP address ($SA_{IP}$) 220, destination IP address ($DA_{IP}$) 230, source media access control (MAC) address ($S_{MAC}$) 240, and destination MAC address ($D_{MAC}$) 250. Payload 210 includes the data to be transmitted by customer device 110-1. Source IP address 220 includes the IP address associated with the source device (i.e., customer device 110-1). Destination IP address 230 includes the IP address associated with the destination device (i.e., device 120). Source MAC address 240 includes the MAC address associated with customer device 110-1. Destination MAC address 250 includes the MAC address associated with router 140.

Returning to FIG. 1, when customer device 110-1 transmits the packet, switch 130 receives and forwards it to router 140 using destination MAC address 250. When router 140 receives the packet, router 140 reads destination IP address 230 to determine how to route the packet. Router 140 then looks up the MAC address of device 120 using, for example, a MAC address table. Router 140 replaces its MAC address in destination MAC address 250 with the MAC address of device 120. Router 140 also replaces the MAC address of customer device 110-1 in source MAC address 240 with its own MAC address (i.e., the MAC address of router 140). Payload 210, source IF address 220, and destination IP address 230 remain the same. Router 140 then transmits the packet to device 120.

In the opposite direction, when device 120 sends a packet to a customer device, such as customer device 110-1, device 120 may generate an Internet Protocol (IP) packet. FIG. 3 is a simplified diagram of an IP packet 300. IP packet 300 includes destination MAC address ($D_{MAC}$) 310, source MAC address ($S_{MAC}$) 320, destination IP address ($DA_{IP}$) 330, source IP address ($SA_{IP}$) 340, and payload 350. Destination MAC address 310 includes the MAC address associated with router 140. Source MAC address 320 includes the MAC address associated with the source device (i.e., device 120). Destination IP address 330 includes the IP address associated with the destination device (i.e., customer device 110-1). Source IP address 340 includes the IP address associated with device 120. Payload 350 includes the data to be transmitted to customer device 110-1.

Returning to FIG. 1, when device 120 transmits the packet, router 140 receives the packet and reads destination IP address 330 to determine how to route the packet. Router 140 then looks up the MAC address of customer device 110-1 using, for example, a MAC address table. Router 140 replaces its MAC address in destination MAC address 310 with the MAC address associated with customer device 110-1. Router 140 also replaces the MAC address associated with device 120 in source MAC address 320 with its own MAC address (i.e., the MAC address of router 140). Payload 350, source IP address 340, and destination IP address 330 remain the same. Router 140 then transmits the packet to switch 130. Switch 130 receives and forwards the packet to customer device 110-1 using destination MAC address 310.

When there is a large number of customer devices 110 connected to router 140 (via switch 130), the size of the MAC address table in router 140 becomes unmanageable. For example, when the number of customer devices 110 reaches one hundred thousand or more, the MAC address table requires one hundred thousand or more entries, making it difficult to build. As a result, system 100 is ineffective for aggregating large numbers of customer devices 110.

FIG. 4 is a diagram of another existing system 400 for connecting a large number of customer devices. System 400 includes customer devices (CDs) 410-1 through 410-N (collectively referred to as customer devices 410) connected to device 420 via routers 430-1 through 430-M (collectively referred to as routers 430) and router 440. Customer devices 410 may include any type of customer device, such as personal computers. Device 420 may include a personal computer or a network device, such as a router or switch. Routers 430 and 440 may include conventional network devices.

Routers 430 and 440 do not scale well. For example, in some implementations both routers 430 and 440 are capable of handling approximately one thousand IP addresses. In order to connect a large number of customer devices 410, such as one hundred thousand customer devices 410, it would be necessary to connect approximately one hundred routers 430 to router 440, thereby creating a complex connection of devices.

As a result, there is a need for mechanisms to facilitate connection of large numbers of customer devices to a single point.

SUMMARY OF THE INVENTION

Systems and methods consistent with the principles of the invention address this and other needs by providing a hybrid device that facilitates connection of large numbers of devices by functioning as a switch in one direction and a router in another direction.

According to one aspect consistent with the principles of the invention, a system aggregates connections to multiple customer devices. The system receives data, performs switching functions on the data when the data is to be transmitted in a first direction, performs routing functions on the data when the data is to be transmitted in a second direction, and transmits the data in the first or second direction.

According to another aspect, a system that aggregates connections to multiple customer devices is provided. The system includes a network device and a hybrid device. The hybrid device connects to the customer devices and the network device. The hybrid device is configured to function as a switch when transmitting data in an upstream direction from the customer devices to the network device and function as a router when transmitting data in a downstream direction from the network device to the customer devices.

According to yet another aspect, a hybrid device includes multiple switch/router modules. Each of the switch/router modules includes switch logic configured to process data transmitted in a first direction as a switch, and router logic configured to process data transmitted in a second direction as a router.

According to a further aspect, a switch/router module is connected between a group of communication devices and a network device. The switch/router module includes switch logic configured to function as a switch when transmitting data in an upstream direction from the communication devices to the network device, and router logic configured to function as a router when transmitting data in a downstream direction from the network device to the communication devices.

According to another aspect, a first network device connects between multiple communication devices and a second network device. The first network device includes multiple switch/router modules, where each of the switch/router modules connects to a group of the communication devices. Each of the switch/router modules includes switch logic and router logic. The switch logic is configured to perform layer 2 switching on data transmitted in a first direction from the communication devices to the second network device. When the switch logic receives data for transmission in the first direction, the switch logic is configured to identify where to forward the data and forward the data without modifying the data. The router logic is configured to perform layer 3 switching on data transmitted in a second direction from the second network device to the communication devices. When the router logic receives data for transmission in the second direction, the router logic is configured to read a destination IP address associated with the data to determine how to route the data, identify a destination MAC address associated with a destination of the data, modify the data to include the identified destination MAC address, and forward the modified data based on the identified destination MAC address.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention provide a hybrid device that is capable of functioning as a switch for traffic flow in one direction and a router for traffic flow in another direction. In one implementation, the hybrid device may provide layer 2 switching for traffic flow in the one direction and layer 3 switching for traffic flow in the other direction. The hybrid device facilitates the aggregation of large numbers of customer devices to a signal point.

While the description to follow will focus on the processing of packets, systems and methods consistent with the principles of the invention are not so limited. In fact, systems and methods consistent with the principles of the invention may operate upon any form of data, including packet and non-packet data.

Exemplary System Overview

Figure 1:
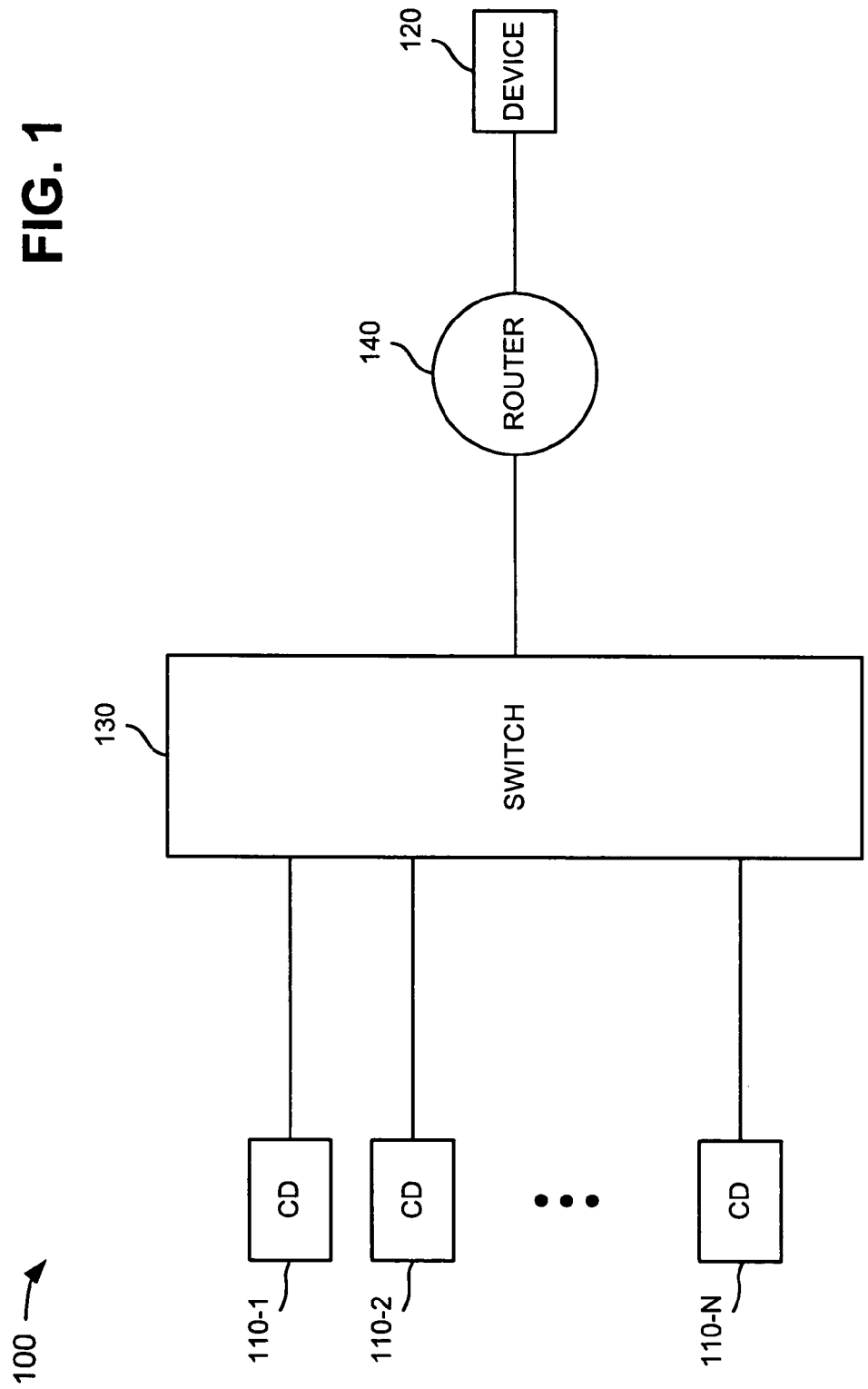
FIG. 1 is a block diagram of an existing system for connecting a large number of customer devices.
Figure 2:
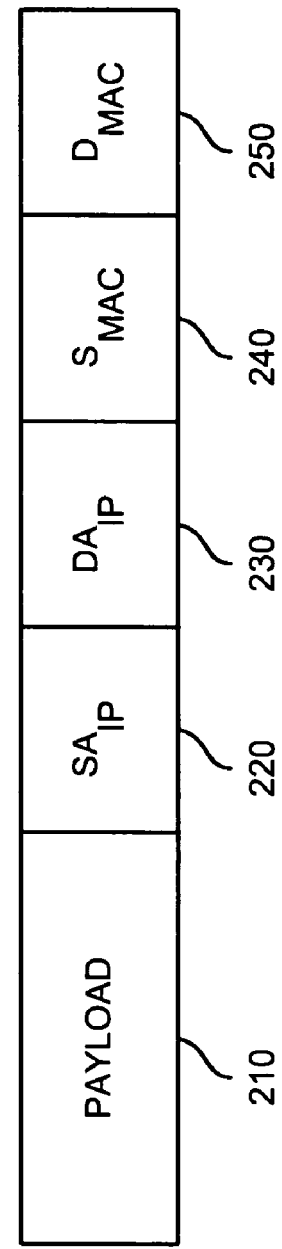
FIG. 2 is a simplified diagram of an IP packet.
Figure 3:
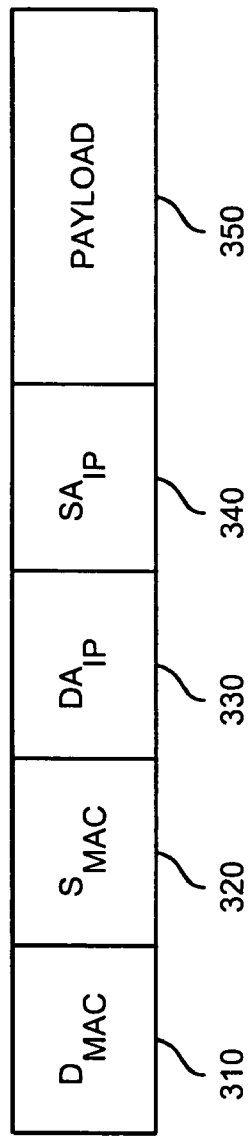
FIG. 3 is a simplified diagram of another IP packet.
Figure 4:
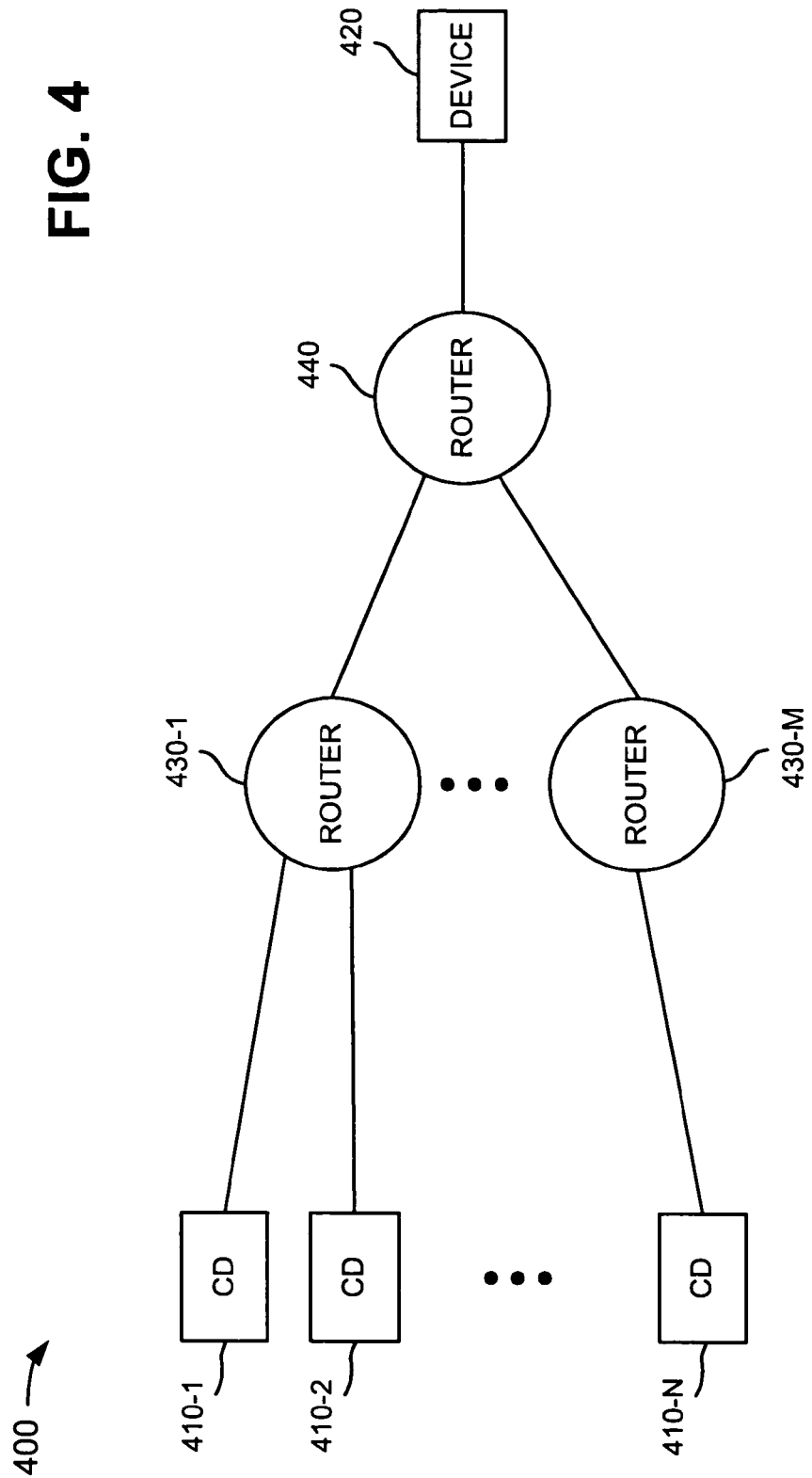
FIG. 4 is a block diagram of another existing system for connecting a large number of customer devices.
Figure 5:
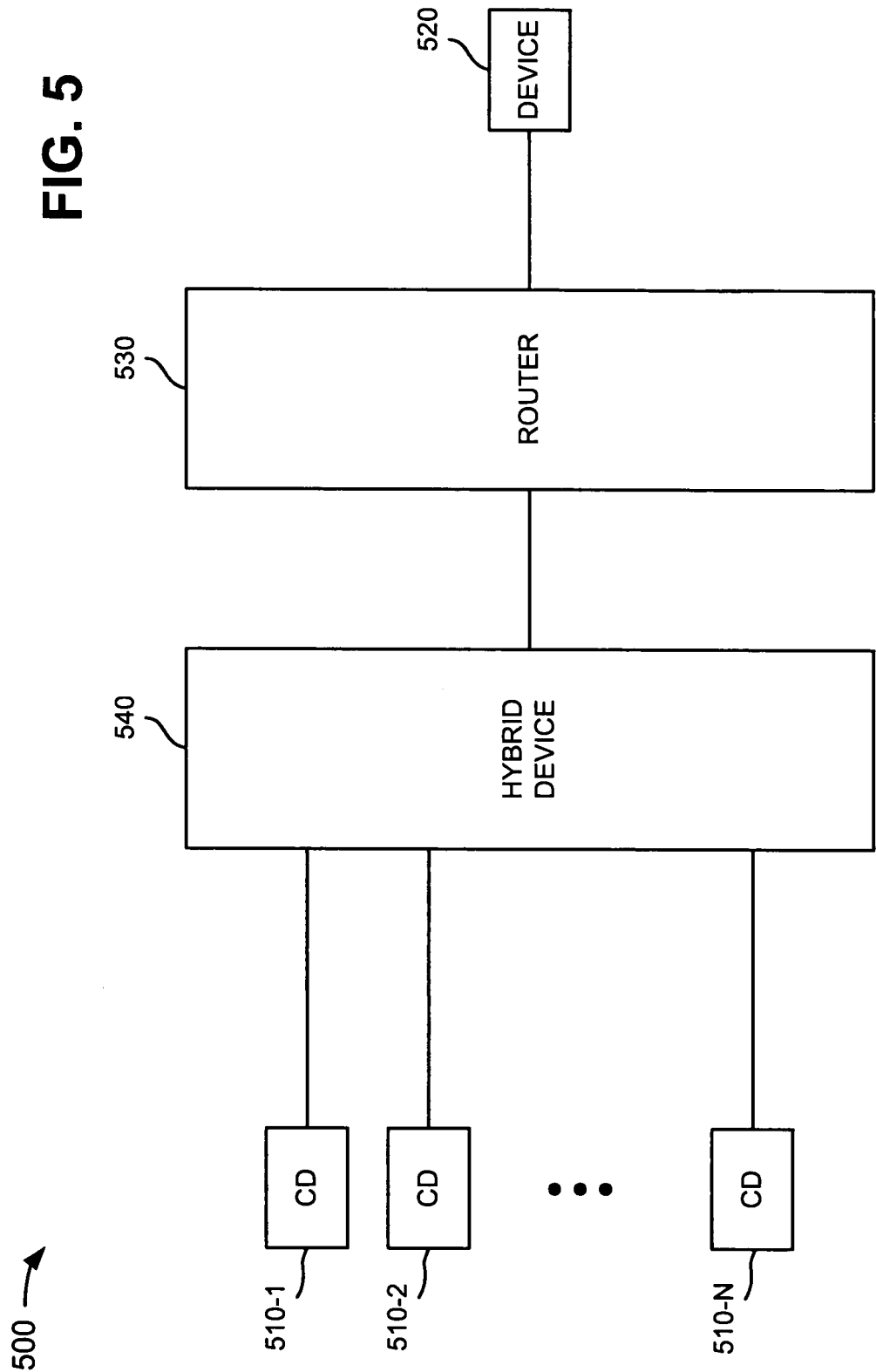
FIG. 5 is an exemplary diagram of a system in which systems and methods consistent with the principles of the invention may be implemented.

FIG. 5 is a block diagram illustrating an exemplary system 500 in which systems and methods consistent with the principles of the invention may be implemented. System 500 may include customer devices (CDs) 510-1 through 510-N (collectively referred to as customer devices 510) connected to device 520 via router 530 and hybrid device 540. While N customer devices 510 and a single device 520, router 530, and hybrid device 540 are shown in FIG. 5, there may be more of these devices in practice. Connections between customer devices 510, device 520, router 530, and hybrid device 540 may be made directly (e.g., point-to-point) or indirectly (e.g., via one or more other devices and/or networks) via wired, wireless, optical connections, other types of connections, or combinations of these.

Customer devices 510 may include wired and/or wireless communication devices, such as personal computers, cable modems, personal digital assistants, and wireless telephone devices. Each of customer devices 510 shown in FIG. 5 may include one or more physical and/or virtual communication devices (e.g., 2400 communication devices). Device 520 may also include a customer device, similar to customer devices 510, or a network device, such as a router or switch. Router 530 may include a conventional router that routes packets along a path from a source to a destination.

Figure 6:
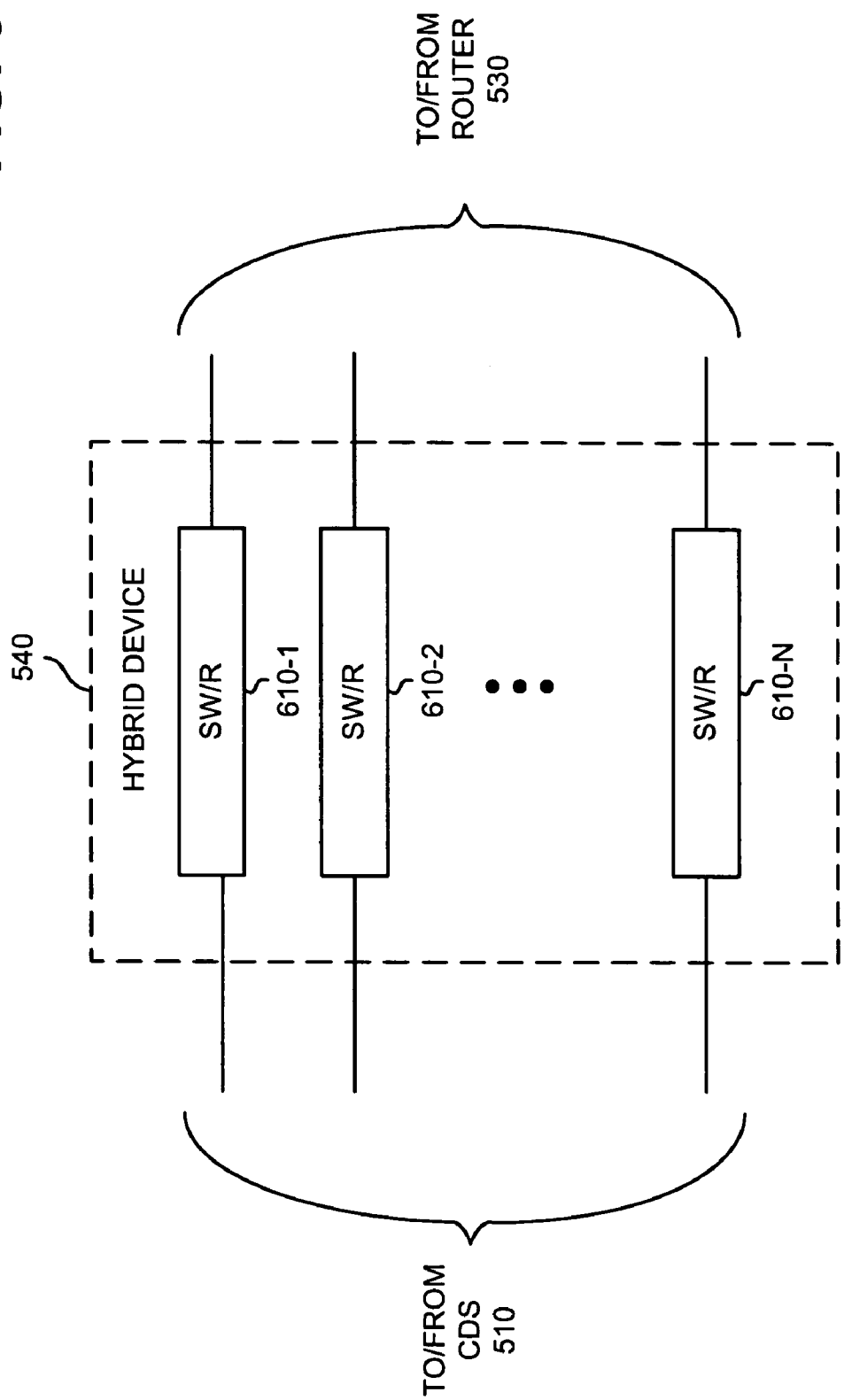
FIG. 6 is an exemplary diagram of the hybrid device of FIG. 5 according to an implementation consistent with the principles of the invention.

Hybrid device 540 may include a network device that provides switching functions (e.g., layer 2 switching) for traffic in one direction and routing functions (e.g., layer 3 switching) for traffic in another direction. FIG. 6 is an exemplary diagram of hybrid device 540 according to an implementation consistent with the principles of the invention. Hybrid device 540 may include one or more switch/router (SW/R) modules 610-1 through 610-N (collectively referred to as switch/router modules 610). In one implementation, each of switch/router modules 610 corresponds to one of customer devices 510, which, as described above, may include multiple communication devices. In other implementations, there may be a different association of switch/router modules 610 to customer devices 510. Switch/router modules 610 may process packets transmitted between customer devices 510 and router 530.

Figure 7:
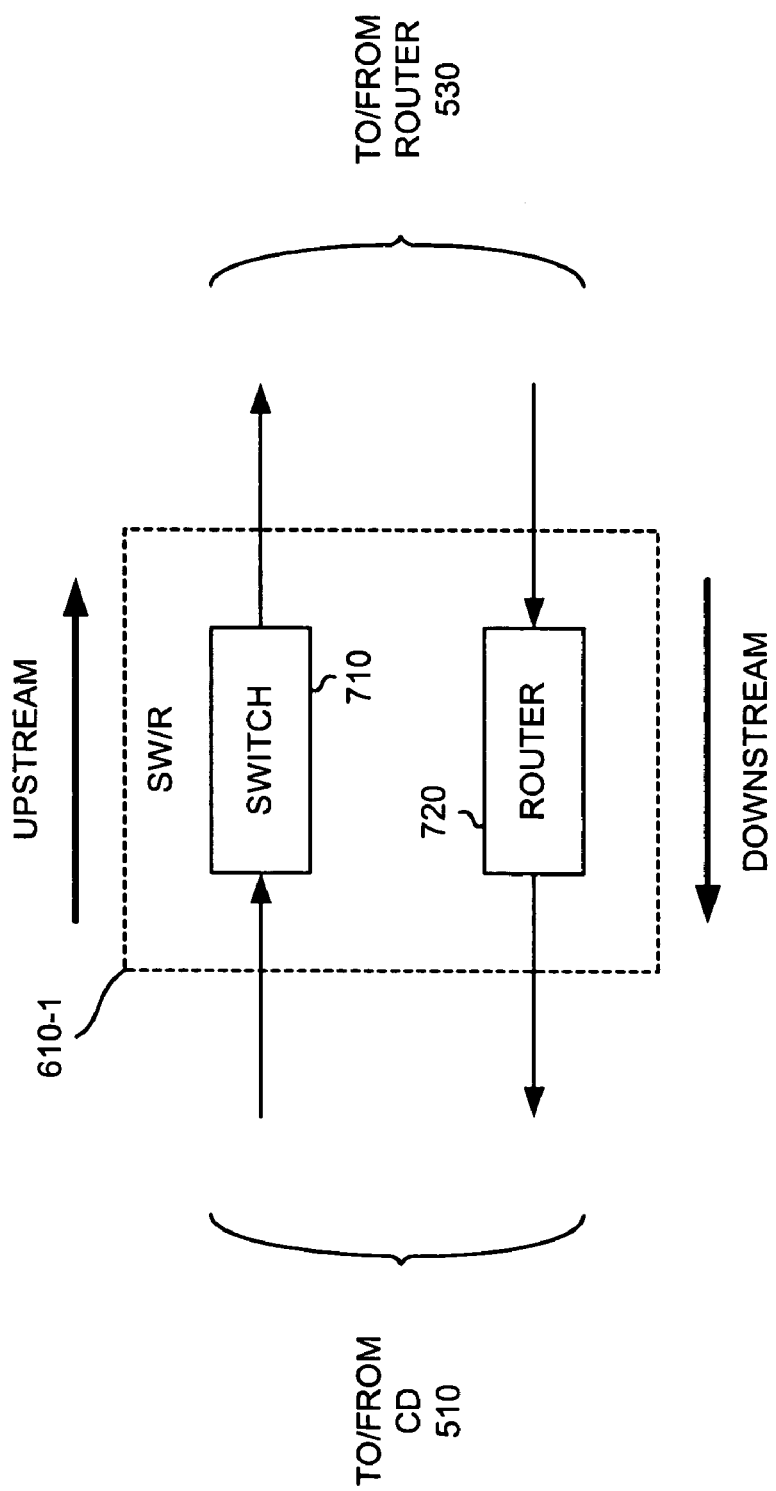
FIG. 7 is an exemplary diagram of a switch/router module of FIG. 6 according to an implementation consistent with the principles of the invention.

FIG. 7 is an exemplary diagram of a switch/router module, such as switch/router module 610-1, according to an implementation consistent with the principles of the invention. Switch/router modules 610-2 through 610-N may be configured similarly. Switch/router module 610-1 may include switch logic 710 and router logic 720. Switch logic 710 may include logic that functions as a switch when transmitting packets in the upstream direction (i.e., in the direction from customer devices 510 to router 530). Router logic 720 may include logic that functions as a router when transmitting packets in the downstream direction (i.e., in the direction from router 530 to customer devices 510).

Exemplary Processing

Figure 8:
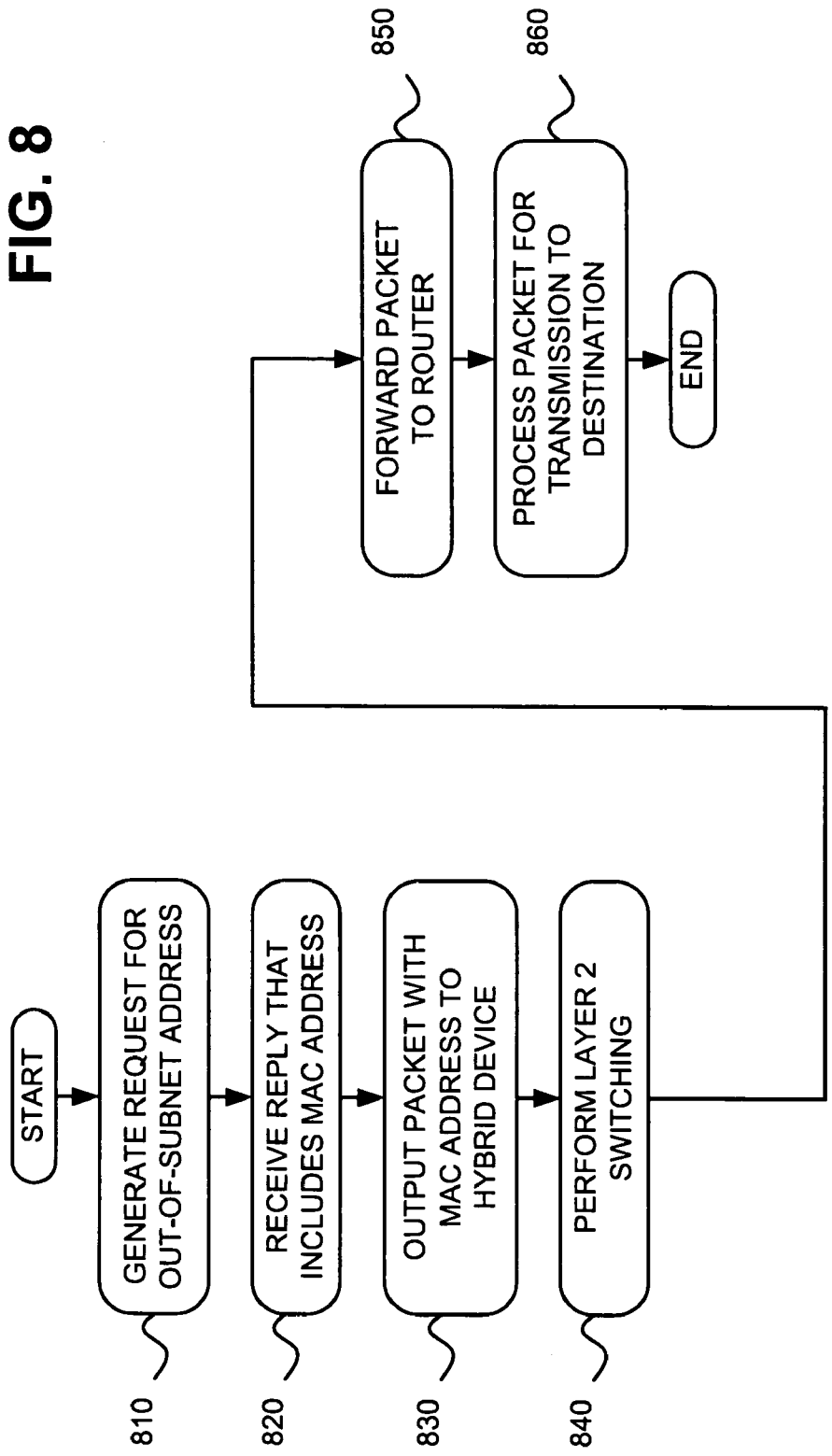
FIG. 8 is a flowchart of exemplary processing within the system of FIG. 5 for packets transmitted in the upstream direction according to an implementation consistent with the principles of the invention.

FIG. 8 is a flowchart of exemplary processing within system 500 for packets transmitted in the upstream direction according to an implementation consistent with the principles of the invention. Processing may begin with a customer device "A," such as customer device 510-1, desiring to transmit a packet to a destination device "X" (e.g., device 520). Customer device 510-1 may generate a request for an out-of-switch/router-subnet address (act 810). For example, customer device 510-1 may use the address resolution protocol (ARP) to obtain the MAC address of the device that is responsible for sending packets outside of the subnet/connected devices of customer device side of switch/router 610-1. In this case, assume that router "R" (e.g., router 530) is the device responsible for sending packets outside of the subnet.

Figure 9:
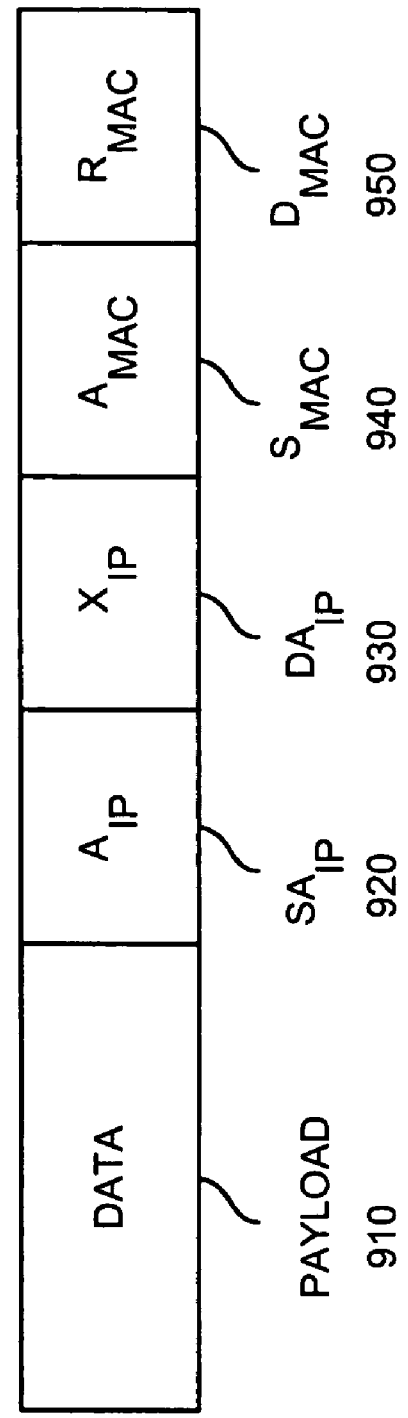
FIG. 9 is an exemplary simplified diagram of a packet according to the implementation of FIG. 8.

Customer device 510-1 may receive a reply to its request, which may, in this case, contain the MAC address of router 530 (act 820). Customer device 510-1 may then populate the packet. FIG. 9 is an exemplary simplified diagram of a packet according to this implementation. The packet may include payload 910, source IP address ($SA_{IP}$) 920, destination IP address ($DA_{IP}$) 930, source MAC address ($S_{MAC}$) 940, and destination MAC address ($D_{MAC}$) 950. Payload 910 may include the data that customer device 510-1 desires to send. Source IP address 920 may include the IP address associated with customer device 510-1. Destination IP address 930 may include the IP address associated with device 520. Source MAC address 940 may include the MAC address associated with customer device 510-1. Destination MAC address 950 may include the MAC address associated with router 530, which it received in the reply to its request.

Returning to FIG. 8, customer device 510-1 may transmit the packet to hybrid device 540 (act 830). Hybrid device 540 may receive the packet and perform layer 2 switching (act 840). For example, switch logic 710 (FIG. 7) of hybrid device 540 may identify where to send the packet and pass the packet onto router 530 like a switch (act 850).

Router 530 may receive the packet and process it, as necessary, for transmission to its destination (e.g., device 520) (act 860). For example, router 530 may read destination IP address 930 to determine how to route the packet. Router 530 may then look up the MAC address of device 520 using, for example, a MAC address table. Router 530 replaces its MAC address in destination MAC address 950 with the MAC address associated with device 520. Router 530 also replaces the MAC address associated with customer device 510-1 in source MAC address 940 with its own MAC address (i.e., the MAC address of router 530). Payload 910, source IP address 920, and destination IP address 930 may remain the same. Router 530 may then transmit the packet toward device 520.

Figure 10:
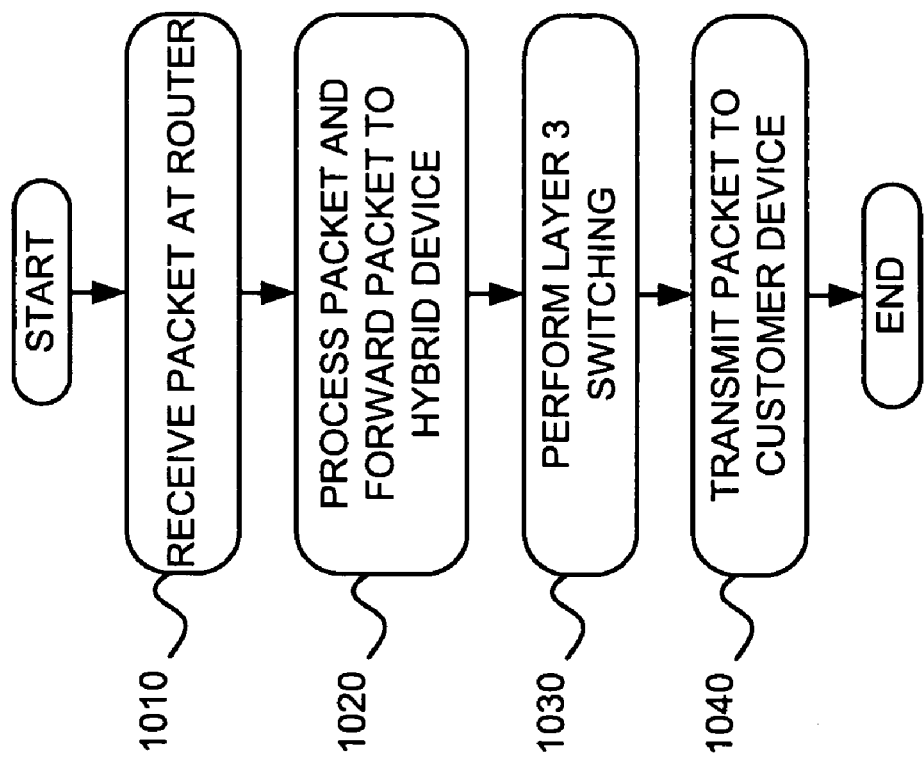
FIG. 10 is a flowchart of exemplary processing within the system of FIG. 5 for packets transmitted in the downstream direction according to an implementation consistent with the principles of the invention.
Figure 11:
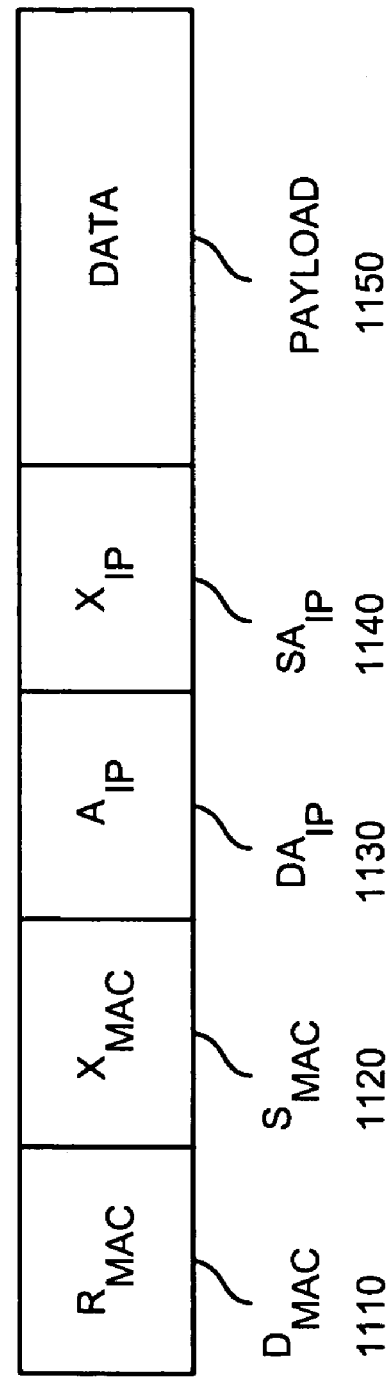
FIG. 11 is an exemplary simplified diagram of a packet according to the implementation of FIG. 10.

FIG. 10 is a flowchart of exemplary processing within system 500 for packets transmitted in the downstream direction according to an implementation consistent with the principles of the invention. Processing may begin with a device "X" (e.g., device 520) desiring to transmit a packet to a customer device "A," such as customer device 510-1. FIG. 11 is an exemplary simplified diagram of a packet according to this implementation. The packet may include destination MAC address ($D_{MAC}$) 1110, source MAC address ($S_{MAC}$) 1120, destination IP address ($DA_{IP}$) 1130, source IP address ($SA_{IP}$) 1140, and payload 1150. Destination MAC address 1110 may include the MAC address associated with router 530 (or another device that connects to router 530). Source MAC address 1120 may include the MAC address associated with device 520. Destination IP address 1130 may include the IP address associated with customer device 510-1. Source IP address 1140 may include the IP address associated with device 520. Payload 1150 may include the data that device 520 desires to send.

Returning to FIG. 10, device 520 may transmit the packet, which is received by router 530 (act 1010). Router 530 may process the packet and forward it to hybrid device 540 (act 1020). For example, router 530 may read destination IP address 1130 to determine how to route the packet. Router 530 then looks up the MAC address of router 720 (within hybrid device 540) that serves customer device 110-1 using, for example, a MAC address table. Router 530 may replace its MAC address in destination MAC address 1110 with the MAC address of router 720. Router 530 may also replace the MAC address of device 520 in source MAC address 1120 with its own MAC address (i.e., the MAC address of router 530). Payload 1150, source IP address 1140, and destination IP address 1130 may remain the same. Router 530 may then transmit the packet to router 720 within hybrid device 540.

Router 720 may receive the packet and perform layer 3 switching (act 1030). For example, router 720 may read destination IP address 1130 to determine how to route the packet. Router 720 then looks up the MAC address of customer device 510-1 using, for example, a MAC address table. Router 720 may replace its MAC address in destination MAC address 1110 with the MAC address of customer device 510-1. Router 530 may also replace the MAC address of router 530 in source MAC address 1120 with its own MAC address (i.e., the MAC address of router 720). Payload 1150, source IP address 1140, and destination IP address 1130 may remain the same. Router 720 may then transmit the packet to client device 510-1 (act 1040).

CONCLUSION

Systems and methods consistent with principles of the invention provide a hybrid device that facilitates the aggregation of hundreds of thousands of customers in a cost effective manner. The hybrid device functions as a switch that may perform layer 2 switching on packets it forwards in an upstream direction and functions as a router that may perform layer 3 switching on packets it forwards in a downstream direction.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, system 500 has been described as including a router 530 connected to hybrid device 540. In another implementation consistent with the principles of the invention, router 530 may be replaced with a switch. In this case, device 520 would need to have knowledge of numerous routers (e.g., routers 720 of hybrid device 540) instead of a single router (i.e., router 530).

Also, certain portions of the invention have been described as "logic" that performs one or more functions. This logic may include hardware, such as an application specific integrated circuit, software, or a combination of hardware and software.

While series of acts have been described with regard to the flowcharts of FIGS. 8 and 9, the order of the acts may differ in other implementations consistent with the principles of the invention. Further, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed:

1. A system for aggregating connections to a plurality of customer devices, comprising:
   a hybrid device to connect to the plurality of customer devices and a network device, where the hybrid device includes a plurality of switch/router modules, each of the plurality of switch/router modules corresponding to a particular group of the plurality of customer devices, and where a first one of the plurality of switch/router modules is to:
      function as a switch, and not as a router, when transmitting a first packet in an upstream direction from a first customer device of the particular group of customer devices to the network device, using an address of the network device, identified in the first packet, where the first one of the plurality of switch/router modules transmits the first packet without modifying a source address identified in the first packet, and
      function as a router when transmitting a second packet in a downstream direction from the network device to the first customer device, using an address table to look up an address of the first customer device.

2. The system of claim 1, where the first switch/router module is to perform layer 2 switching in the upstream direction and layer 3 switching in the downstream direction.

3. The system of claim 1, where the network device is a router.

4. The system of claim 1, where the network device is a switch.

5. The system of claim 1, where the hybrid device is to connect to approximately one hundred thousand or more of the plurality of customer devices.

6. The system of claim 1, where the hybrid device is to connect to ten thousand or more of the plurality of customer devices.

7. The system of claim 1, where each of the switch/router modules includes:
   switch logic that provides switch functionality, and
   router logic that provides router functionality.

8. The system of claim 1, where, when the hybrid device receives the second packet for transmission in the downstream direction, the hybrid device is to:
   read a destination Internet Protocol (IP) address associated with the second packet to determine how to route the second packet,
   identify a destination media access control (MAC) address associated with a destination of the second packet, and
   forward the second packet based on the identified destination MAC address.

9. A hybrid device for connecting between a plurality of customer devices and a network device, comprising:
   means for determining whether a packet received at the hybrid device is to be transmitted in an upstream direction from one of the plurality of customer devices to the network device or in a downstream direction from the network device to the one customer device;
   means for processing the received packet by:
      providing switching functionality, using an address, identified in the packet, of the network device, to form a switched packet without modifying an address associated with the one customer device, identified in the packet, when a result of the determining is that the received packet is to be transmitted in the upstream direction and not in the downstream direction, and
      providing routing functionality, using an address table to look up an address of the one customer device, to form a routed packet, when the result of the determining is that the received packet is to be transmitted in the downstream direction and not in the upstream direction, where the means for processing corresponds to the one customer device; and
   means for transmitting the switched packet in the upstream direction or the routed packet in the downstream direction.

10. A method for aggregating connections to a plurality of customer devices, the method comprising:
   receiving a plurality of packets at a hybrid network device;
   performing, by a particular one of a plurality of switch/router modules of the hybrid device, only switching functions on a first one of the plurality of packets when the first packet is to be transmitted in an upstream direction to a network device, where the switching functions do not include modifying a source address included in the first packet;
   performing, by the particular switch/router module, only routing functions on a second one of the plurality of packets when the second packet is to be transmitted in a downstream direction to a particular group of customer devices of the plurality of customer devices corresponding to the particular switch/router module; and
   transmitting the first packet in the upstream direction and the second packet in the downstream direction.

11. The method of claim 10, where the performing only switching functions includes:
   performing layer 2 processing on the first packet.

12. The method of claim 10, where the performing only routing functions includes:
performing layer 3 processing on the second packet.

13. The method of claim 10, where the performing only routing functions and transmitting the second packet include:
reading a destination Internet Protocol (IP) address associated with the second packet to determine how to route the second packet,
identifying a destination media access control (MAC) address associated with a destination of the second packet,
modifying the second packet to include the identified destination MAC address, and forwarding the modified second packet based on the identified destination MAC address.

14. A hybrid device, comprising:
a plurality of switch/router modules, each of the switch/router modules corresponding to one communication device, of a plurality of communication devices, and including:
switch logic to forward, without using an address table, a first packet transmitted in an upstream direction from the one communication device, where, the switch logic forwards the first packet without modification to an address associated with the one communication device, and
router logic to process, using an address table, a second packet transmitted in a downstream direction to the one communication device.

15. The device of claim 14, where each of the switch/router modules connects to the plurality of communication devices.

16. The device of claim 14, where the switch logic is to perform layer 2 switching in the upstream direction only.

17. The device of claim 14, where the router logic is to perform layer 3 switching in the downstream direction only.

18. The device of claim 14, where, when the router logic receives the second packet for transmission in the downstream direction, the router logic is to:
read a destination Internet Protocol (IP) address associated with the second packet to determine how to route the second packet,
identify a destination media access control (MAC) address associated with a destination of the second packet,
modify the second packet to include the identified destination MAC address, and
forward the modified second packet based on the identified destination MAC address.

19. A switch/router module corresponding to a particular group of a plurality of communication devices and a network device, comprising:
switch logic to function as a switch, when transmitting first packets in an upstream direction and not in a downstream direction from a first communication device of the particular group of communication devices to the network device, using an address, identified in the first packets, of the network device, where the switch logic does not modify an address associated with the first communication device, identified in the first packets; and
router logic to function as a router when transmitting second packets in the downstream direction and not in the upstream direction from the network device to the first communication device, using an address table to look up an address of the first communication device.

20. A first network device to connect a plurality of communication devices and a second network device, comprising:
a plurality of switch/router modules, each of the switch/router modules corresponding to one of the plurality of the communication devices and including:
switch logic to perform layer 2 switching on first packets transmitted in a first direction from the communication devices to the second network device, when the switch logic receives the first packets for transmission in the first direction, the switch logic to:
identify where to forward the first packets, and
forward the first packets without modifying a source address identified in the first packets; and
router logic to perform layer 3 switching on second packets transmitted in a second direction from the second network device to at least one of the communication devices, when the router logic receives the second packets for transmission in the second direction, the router logic is to:
read a destination Internet Protocol (IP) address associated with the second packets to determine how to route the second packets,
look up a destination media access control (MAC) address associated with a destination of the second packets using an address table,
modify the second packets to include the identified destination MAC address and a source MAC address associated with a first one of the switch/router modules, and
forward the modified second packets based on the identified destination MAC address.

* * * * *